(12) United States Patent
Yamada

(10) Patent No.: US 8,879,802 B2
(45) Date of Patent: Nov. 4, 2014

(54) IMAGE PROCESSING APPARATUS AND IMAGE PROCESSING METHOD

(75) Inventor: Satoshi Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/293,863

(22) Filed: Nov. 10, 2011

(65) Prior Publication Data

US 2012/0140994 A1  Jun. 7, 2012

(30) Foreign Application Priority Data

Dec. 1, 2010  (JP) ................................ 2010-268719

(51) Int. Cl.
*G06K 9/00* (2006.01)
*G06F 21/32* (2013.01)
*G06K 9/03* (2006.01)
*H04N 5/232* (2006.01)

(52) U.S. Cl.
CPC ............ *G06K 9/00228* (2013.01); *G06F 21/32* (2013.01); *G06K 9/036* (2013.01); *H04N 5/23219* (2013.01)
USPC ........................................................ 382/118

(58) Field of Classification Search
None
See application file for complete search history.

(56) References Cited

U.S. PATENT DOCUMENTS

| 2002/0090116 | A1* | 7/2002 | Miichi et al. ................ 382/118 |
| 2009/0220156 | A1 | 9/2009 | Ito et al. |
| 2010/0020224 | A1* | 1/2010 | Hattori et al. ............ 348/333.11 |
| 2010/0111363 | A1* | 5/2010 | Kelly et al. .................. 382/103 |

FOREIGN PATENT DOCUMENTS

| CN | 1968357 A | 5/2007 |
| CN | 101140620 A | 3/2008 |
| CN | 101847187 A | 9/2010 |
| JP | 06-032154 | 2/1994 |
| JP | 2000-030065 | 1/2000 |
| JP | 2004-038531 | 2/2004 |
| JP | 2004-294498 | 10/2004 |
| JP | 2005-227957 A | 8/2005 |
| JP | 2006-178651 A | 7/2006 |
| JP | 2007-148968 A | 6/2007 |
| JP | 2008-040781 | 2/2008 |
| JP | 2008-310775 | 12/2008 |

OTHER PUBLICATIONS

Mar. 4, 2014 Chinese Office Action, that issued in Chinese Patent Application No. 201110396341.1.
Jul. 25, 2014 Japanese Office Action, that issued in Japanese Patent Application No. 2010-268719.

* cited by examiner

*Primary Examiner* — Stephen R Koziol
*Assistant Examiner* — Amandeep Saini
(74) *Attorney, Agent, or Firm* — Cowan, Liebowitz & Latman, P.C.

(57) ABSTRACT

An image processing apparatus comprises a face detection unit configured to periodically perform face detection processing of detecting a face area of a person from an image; an authentication unit configured to periodically perform personal authentication processing for the detected face area; and a calculation unit configured to calculate a determination criterion to select a face area as a target of the personal authentication processing from the detected face areas, wherein the authentication unit performs the personal authentication processing at a cycle longer than that of the face detection processing, and when the face detection unit detects the face areas from a plurality of images, selects a face area complying with the determination criterion calculated by the calculation unit from the face areas of the plurality of images as the target of the personal authentication processing.

21 Claims, 6 Drawing Sheets

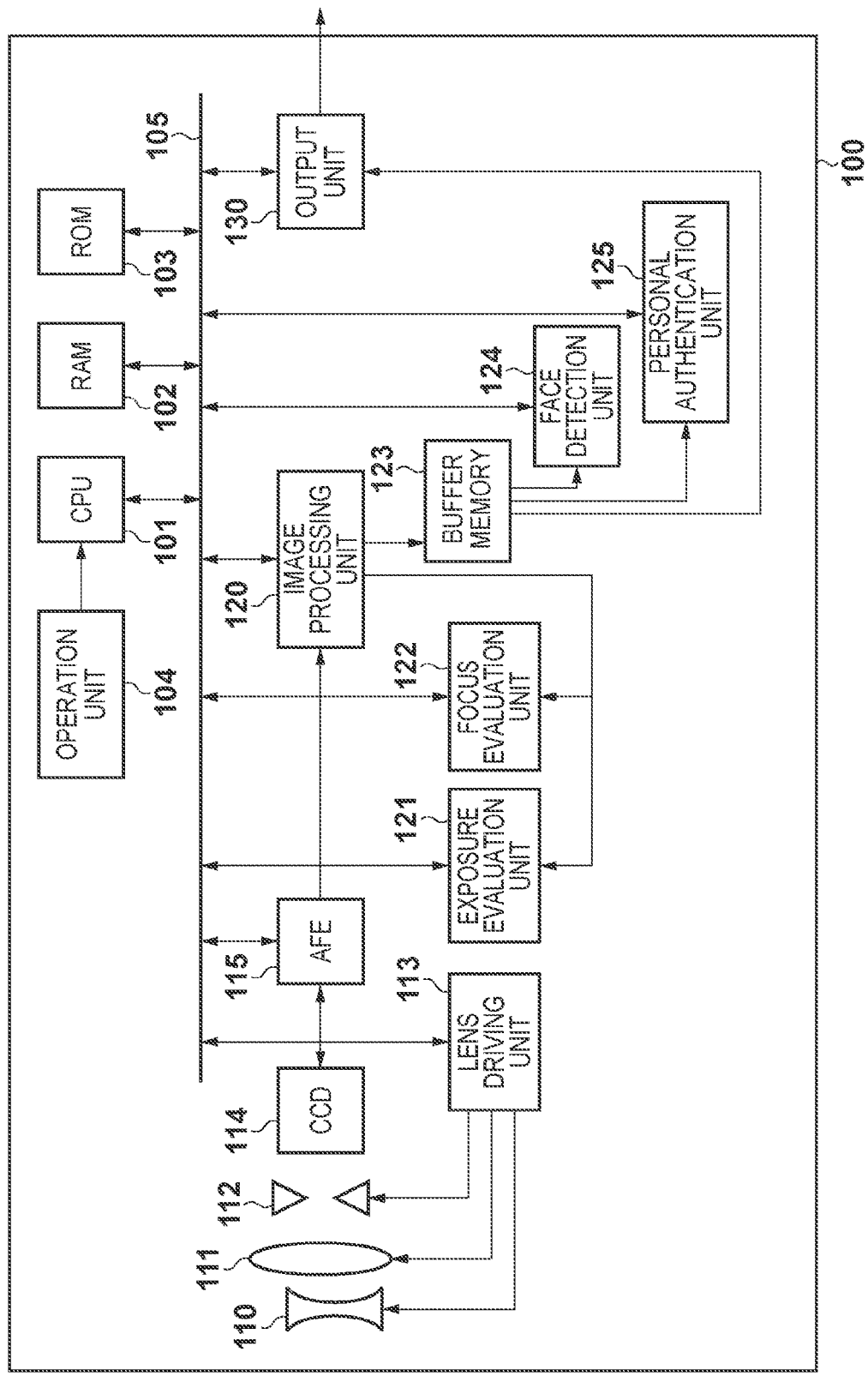

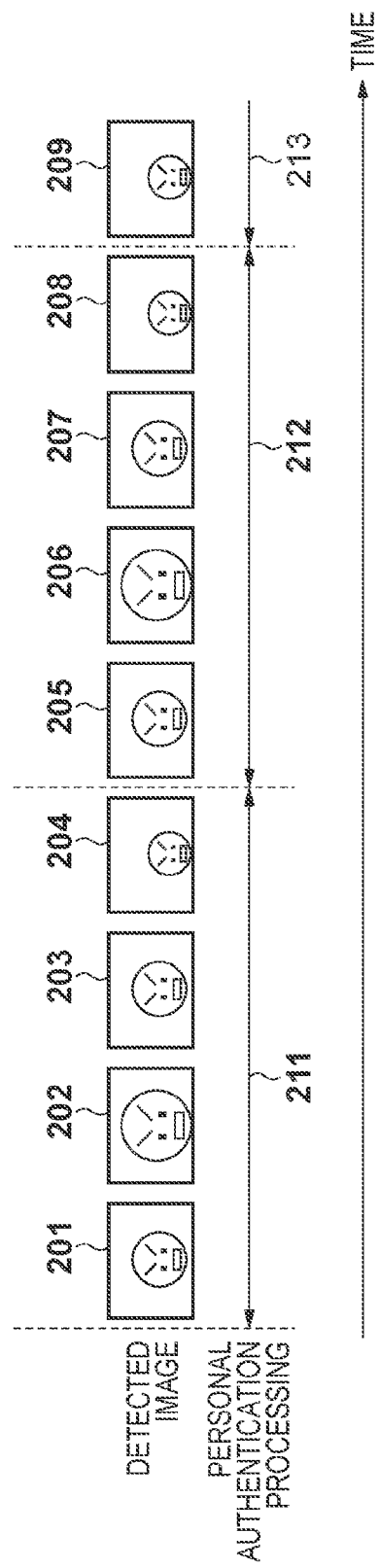

CONTINUOUSLY CAPTURED IMAGES

DETECTION RESULT OF EACH IMAGE

| DETECTED IMAGE | FRAME1 | FRAME2 | FRAME3 | FRAME4 |
|---|---|---|---|---|
| FACE A | 40 | 60 | 40 | 20 |

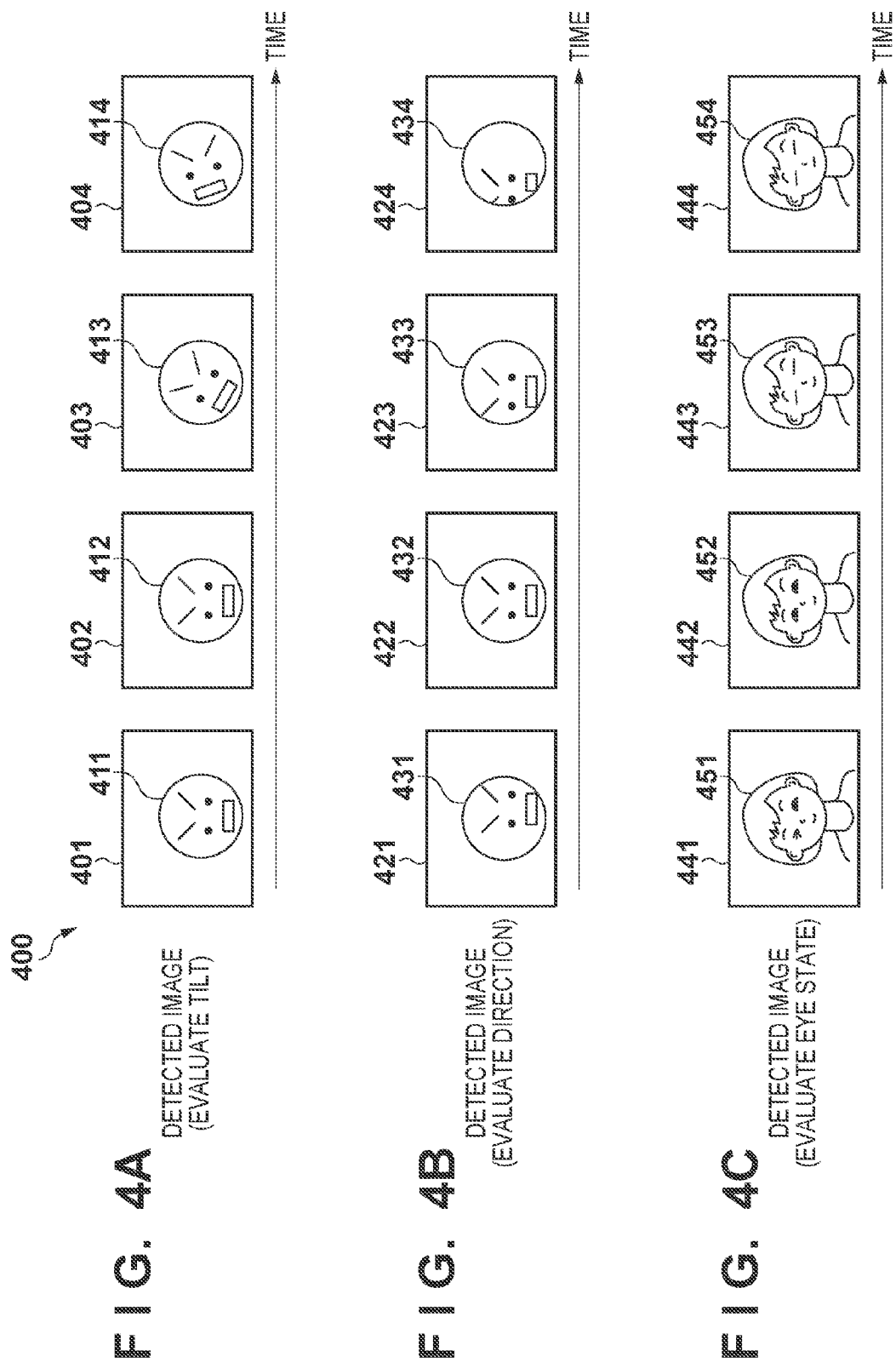

CONTINUOUSLY CAPTURED IMAGES

FRAME1　　FRAME2　　FRAME3　　FRAME4　→ TIME

DETECTION RESULT OF EACH IMAGE

| FACE DETECTED IMAGE | FRAME1 | FRAME2 | FRAME3 | FRAME4 |
|---|---|---|---|---|
| FACE A | 40 | 40 | 50 | 40 |
| FACE B | × | 40 | 35 | 30 |
| FACE C | 55 | 50 | × | × |

EXAMPLE IN WHICH ALL DETECTION RESULTS HAVE SMALL VALUES

| FACE DETECTED IMAGE | FRAME1 | FRAME2 | FRAME3 | FRAME4 |
|---|---|---|---|---|
| FACE A | 10 | 10 | 10 | 10 |
| FACE B | × | 15 | 10 | 15 |
| FACE C | 15 | 15 | × | × |

IMAGE PROCESSING APPARATUS AND IMAGE PROCESSING METHOD

BACKGROUND OF THE INVENTION

1. Field of the Invention

The present invention relates to an image processing apparatus and image processing method, particularly to an image processing technique of detecting a personal face from an image and performing personal authentication for the detected face.

2. Description of the Related Art

In recent years, still cameras capable of performing personal authentication have been introduced, which periodically detect a face during shooting and compare it with personal information held in advance, thereby identifying whose the face is. Such a camera performs face detection a number of times per second. After the face detection, personal authentication is executed using the detection result. Personal authentication processing takes a longer time than face detection. Hence, face detection is performed a number of times during that time.

However, the detected face is not necessarily optimal for personal authentication. For example, the face may tilt or include eye closure. In this case, no reliable personal authentication result can be obtained.

As an optimal face detection method to solve this problem, Japanese Patent Laid-Open No. 2008-310775 describes an image processing apparatus which determines the detection result each time while performing face detection, and uses only a face satisfying conditions for facial expression recognition. Using only a face satisfying conditions for facial expression recognition enables to extract an optimum face.

However, when performing personal authentication of the above-described related art, the start of personal authentication delays because it is necessary to wait for the face detection result to satisfy the predetermined conditions. For this reason, the time to obtain the personal authentication result may be longer.

SUMMARY OF THE INVENTION

The present invention has been made in consideration of the aforementioned problems, and realizes an image processing technique capable of obtaining a high authentication accuracy in every personal authentication period by selecting a face of a suitable condition from faces detected from a plurality of images received during the period of one cycle of personal authentication.

In order to solve the aforementioned problems, the present invention provides an image processing apparatus comprising: a face detection unit configured to periodically perform face detection processing of detecting a face area of a person from an image; an authentication unit configured to periodically perform personal authentication processing for the face area detected by the face detection unit; and a calculation unit configured to calculate a determination criterion to select a face area as a target of the personal authentication processing from the face areas detected by the face detection unit, wherein the authentication unit performs the personal authentication processing at a cycle longer than that of the face detection processing by the face detection unit, and when the face detection unit detects the face areas from a plurality of images, selects a face area complying with the determination criterion calculated by the calculation unit from the face areas of the plurality of images as the target of the personal authentication processing.

In order to solve the aforementioned problems, the present invention provides an image processing method comprising: a face detection step of periodically performing face detection processing of detecting a face area of a person from an image; an authentication step of periodically performing personal authentication processing for the face area detected in the face detection step; and a calculation step of calculating a determination criterion to select a face area as a target of the personal authentication processing from the face areas detected in the face detection step, wherein in the authentication step, the personal authentication processing is performed at a cycle longer than that of the face detection processing, and when the face areas are detected from a plurality of images in the face detection step, a face area complying with the determination criterion calculated in the calculation step is selected from the face areas of the plurality of images as the target of the personal authentication processing.

According to the present invention, it is possible to obtain a high authentication accuracy in every personal authentication period by selecting a face of a suitable condition from faces detected from a plurality of images received during the period of one cycle of personal authentication.

Further features of the present invention will become apparent from the following description of exemplary embodiments (with reference to the attached drawings).

BRIEF DESCRIPTION OF THE DRAWINGS

FIG. 1 is a block diagram of an image processing apparatus according to an embodiment of the present invention;

FIG. 2 is a view for explaining the processing cycle of each of face detection processing and personal authentication processing;

FIGS. 4A to 4C are views illustrating a method of determining a personal authentication target face according to the first embodiment;

DESCRIPTION OF THE EMBODIMENTS

Figures 3A, 3B:
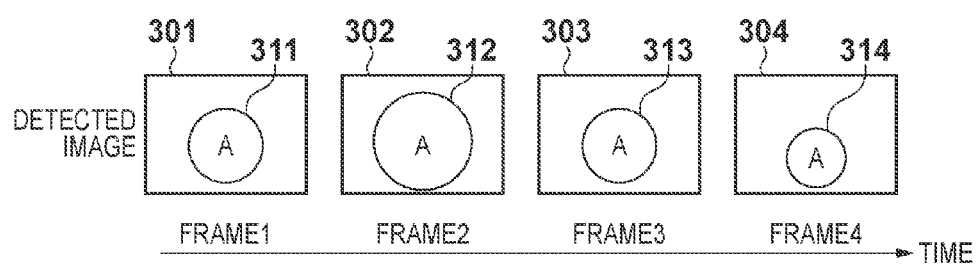
FIGS. 3A and 3B are views illustrating images and detection results obtained by face detection during the period of one cycle of personal authentication according to the first embodiment.

The embodiments of the present invention will now be described in detail. Note that the embodiments to be described below are merely examples for implementing the present invention and should appropriately be changed or modified depending on various kinds of conditions or the arrangement of the apparatus to which the present invention is applied, and the present invention is not limited to the following embodiments. The embodiments to be described below may be appropriately and partially combined.

First Embodiment

The first embodiment will be described first. An image processing apparatus of the present invention will be described below as a digital video camera that performs face detection and personal authentication for taken images (moving images or still images).

<Arrangement of Video Camera>

The arrangement of a video camera 100 will be explained first with reference to FIG. 1. Referring to FIG. 1, the video camera 100 includes a control system formed from units 101 to 104. The CPU 101 executes various kinds of arithmetic processing in accordance with programs. The RAM 102 forms a volatile memory that temporarily holds programs, data, and the like. The ROM 103 forms an auxiliary storage device such as a hard disk drive or a nonvolatile memory such as a flash memory. The operation unit 104 accepts user operations.

The CPU 101 is connected to the blocks such as the RAM 102, the ROM 103, and the operation unit 104 via an internal bus 105 and controls them based on a control program stored in the ROM 103. The RAM 102 is used as temporary data storage at the time of arithmetic processing by the CPU 101. The operation unit 104 includes operation members such as buttons, keys, and levers operable by the user and outputs an operation input by the user to the CPU 101. The CPU 101 executes various kinds of arithmetic processing based on the user operation instructions.

The video camera 100 also includes an image capturing optical system formed from units 110 to 114. Reference numeral 110 denotes a zoom lens; 111, a focusing lens; and 112, a stop. The lens driving unit 113 drives the lenses 110 and 111 and the stop 112. The image sensing element 114 forms an image sensor made of a CCD or a CMOS that converts an object image into an electrical signal. Light that has passed through the zoom lens 110 and the focusing lens 111 forms an image on the image sensing plane of the image sensing element 114. The optical image on the image sensing plane is photoelectrically converted and output as an image signal. The lens driving unit 113 drives the zoom lens 110, the focusing lens 111, and the stop 112 in accordance with a control command from the CPU 101, thereby adjusting the optical zoom ratio, focusing, and the aperture value. An AFE 115 drives the image sensing element 114 at an electronic shutter speed according to a control command from the CPU 101 to read out the image signal of one frame every 1/60 sec and perform sample-and-hold and amplification of the image signal and conversion to a digital signal.

The video camera 100 also includes an image processing unit 120, an exposure evaluation unit 121, a focus evaluation unit 122, a buffer memory 123, a face detection unit 124, and a personal authentication unit 125 as an image processing system. The image processing unit 120 receives the image signal from the image sensing element 114 via the AFE 115, performs signal processing such as color conversion, and outputs the signal to the buffer memory 123 based on a control command from the CPU 101. The exposure evaluation unit 121 and the focus evaluation unit 122 evaluate the exposure state and the focus state of a plurality of image areas included in the image signal acquired from the image processing unit 120. The face detection unit 124 reads out an image signal from the buffer memory 123 for each frame and periodically detects the number of personal faces included in the image and their sizes and positions.

The CPU 101 temporarily stores, in the buffer memory 123, the image data used by the face detection unit 124 for the detection. For each image data stored in the buffer memory 123, the detection target image data is stored in the RAM 102 in association with the face detection result such as the size and position of the face detected by the face detection unit 124.

The personal authentication unit 125 executes personal authentication processing at a predetermined cycle slower than the face detection processing in accordance with a control command from the CPU 101. In the personal authentication processing, a face selected based on a determination criterion (to be described later) from the faces detected by the face detection unit 124 is compared with the face of each person registered in the personal information list stored in the ROM 103. It is then determined whether there is a person whose face is similar to the detected face. That is, the personal authentication unit 125 calculates the similarity between the face (image data) selected based on the determination criterion (to be described later) from the faces detected by the face detection unit 124 and the face (image data) registered in the personal information list. To calculate the similarity, the size, the angle, the luminance, and the like of face image data are normalized, and KL expansion of the Fourier spectrum is then used, as disclosed in, for example, Japanese Patent Laid-Open No. 2000-030065. Alternatively, detected face image data is normalized based on the distance to the face and subjected to matching, as disclosed in Japanese Patent Laid-Open No. 2004-038531. Note that the face image data registered in advance indicates the compressed and stored face image data itself or information representing features amounts concerning the face, including the eye, the nose, the mouth, and the eyebrow.

The video camera 100 also includes an output unit 130 that forms an interface such as a USB, and outputs the image signal read out from the buffer memory 123 to an external device such as a personal computer (PC) or a printer.

<Face Detection Processing and Personal Authentication Processing>

Face detection processing and personal authentication processing will be described next with reference to FIG. 2.

FIG. 2 illustrates image data used for face detection in every period of one cycle of personal authentication. "Detected image" in FIG. 2 means an image read out from the buffer memory 123 and put to face detection processing by the face detection unit 124. Images 201 to 209 are defined as detected images. First, the image 201 is read out from the buffer memory 123, and face detection processing is performed. In the same way, face detection processing is sequentially performed for the images 202, 203, and 204 in this order. The CPU 101 selects a face of a suitable condition that satisfies a predetermined determination condition from the faces detected from the detected images 201 to 204. The personal authentication unit 125 performs personal authentication processing for the selected face.

"Personal authentication processing" in FIG. 2 represents the processing period in the personal authentication unit 125. Each of periods 211 and 212 is the period of one cycle of personal authentication. The detected images 201 to 204 are processed in the next personal authentication processing period 212. Similarly, the detected images 205 to 208 are processed in the next personal authentication processing period 213. In this embodiment, face detection is done four times in one cycle of personal authentication processing, as shown in FIG. 2.

The operation of the buffer memory 123 will be described. The detected images 201 to 204 corresponding to the results of face detection performed in the personal authentication processing period 211 in FIG. 2 are stored in the buffer memory 123 and the RAM 102. The CPU 101 uses the face detected from the detected image 202 in the personal authentication processing during the next personal authentication processing period 212 as the face of suitable conditions. When the personal authentication unit 125 starts personal authentication processing during the personal authentication processing period 212, the CPU 101 deletes the detected images 201, 203, and 204 and their face detection results while leaving the detected image 202 and its face detection result in the buffer memory 123. Then, the next detected images 205 to 208 are sequentially stored.

As described above, according to this embodiment, the CPU 101 selects a face of a suitable condition from the detected images 201 to 204 that have undergone face detection during the personal authentication processing period 211, and personal authentication processing is performed for the selected face.

Note that as the face detection method, flesh color data is extracted from image data, and an area determined to fall within the flesh color range is extracted as a face area. However, another method of, for example, placing focus on a facial part such as the eye, the nose, or the mouth or using elliptical shape information focusing on the facial outline may be used.

<Face Selection Method>

The method of causing the CPU 101 to select a face of a suitable condition from detected images as the target of personal authentication processing will be described next with reference to FIGS. 3A and 3B. The CPU 101 calculates the size of a detected face (the number of pixels included in the face area) as a determination criterion, and selects the face having the largest face area from the faces detected during the period of one cycle of personal authentication as the personal authentication target face. This is because the larger the face area is, the larger the number of pixels is, and the higher the personal authentication accuracy is.

FIG. 3A illustrates detected images received during the period of one cycle of personal authentication. Referring to FIG. 3A, the face detection unit 124 performs detection processing for a detected image 301 (frame 1), a detected image 302 (frame 2), a detected image 303 (frame 3), and a detected image 304 (frame 4) in this order.

Each of areas 311 to 314 of the detected images 301 to 304 schematically represents the face area of a person A detected by the face detection unit 124. The CPU 101 determines the face of a suitable condition for personal authentication from the faces detected from the four detected images 301 to 304.

FIG. 3B illustrates the detection result that represents the size of the face in each image detected by the face detection unit 124 as a numerical value. The face detection unit 124 calculates the face size and sets a larger value for a larger face in the detected images. The size of the face of the person A detected in frame 2 of FIG. 3B is 60 which is the largest in the four values. Based on this detection result, the CPU 101 determines the face 312 of the person A in frame 2 as the personal authentication target face of a suitable condition.

<Example of Determination Criterion>

In this embodiment, the face size is used as the determination criterion of the personal authentication target face. However, another determination criterion may be applied. For example, assuming that the face detection unit 124 can detect the tilt of a face (for example, the tilt of a line that connects the mouth, the nose, and the center between the eyes with respect to the vertical direction), a face with a smaller tilt may be selected using the face tilt as the determination criterion. More specifically, as shown in FIG. 4A, the face detection unit 124 detects the tilt of each face from detected images 401 to 404. The CPU 101 calculates the detected tilt of each face as the determination criterion, and determines the personal authentication target face of a suitable condition. In this case, the CPU 101 selects a face 412 with the smallest tilt from faces 411 to 414 detected from the detected images 401 to 404.

Alternatively, assuming that the face detection unit 124 can detect the direction of a face (with respect to the front), the face directed most frontward may be selected using the face direction as the determination criterion. More specifically, as shown in FIG. 4B, the face detection unit 124 detects the direction of each face from detected images 421 to 424. The CPU 101 calculates the detected direction of each face as the determination criterion, and determines the personal authentication target face of a suitable condition. In this case, the CPU 101 selects a face 432 directed frontward from faces 431 to 434 detected from the detected images 421 to 424.

Otherwise, a facial expression detection unit configured to detect a facial expression (for example, smile or eye closure) may be added, and, for example, a face without eye closure may be selected using the facial expression as the determination criterion. More specifically, as shown in FIG. 4C, the face detection unit 124 detects faces 451 to 454 from detected images 441 to 444. The facial expression detection unit detects the eye closure state in each of the faces 451 to 454. The CPU 101 calculates the detected eye closure state of each face as the determination criterion, and determines the personal authentication target face of a suitable condition. In this case, the CPU 101 selects the face 452 without eye closure from the faces 451 to 454 detected from the detected images 441 to 444.

Note that to determine the facial expression such as smile, a method as described in Japanese Patent Laid-Open No. 2004-294498 is applicable, which extracts the facial outline shape, the eye shape, the mouth shape, and the like and performs pattern matching between their relative positions and shapes and shapes standardized in advance, thereby determining whether the facial expression is smile. In general, when the facial expression changes to smile, the two corners of the mouth move to the upper side of the face, and the eyes half-close. Hence, for example, if it is detected upon pattern matching that the corners of the mouth shape rise and that the eye opening ratio is equal to or smaller than a given threshold, the facial expression can be determined as smile. Note that the eye opening ratio takes a large value as the eyes open largely.

To determine eye closure, a method as described in Japanese Patent Laid-Open No. 06-032154 is applicable, which extracts an eye from a black area inside the facial outline and determines the open/close state of the eye using the maximum number of black pixels that form a continuous area in the extracted eye area. The number of black pixels of the continuous area is 0 when the eye is completely close, and takes a positive value when the eye is open. Hence, for example, using the maximum number of black pixels of the continuous area as the eye opening ratio, if the value is equal to or smaller than a given threshold, the facial expression can be determined as eye closure.

A motion vector detection unit configured to detect the motion of a face may be added, and a face with a small motion may be selected using the face motion as the determination criterion. This is because if the motion vector is large, the face in the image may blur or defocus.

The face closest to the center or the brightest face in the detected images may be used as the determination criterion. A plurality of determination criteria such as the size, the tilt, and the direction of a face, the eye state, and the motion vector may be combined appropriately. At this time, priority (weight) may be added to each determination criterion to give higher priority to a specific determination criterion.

According to the above-described embodiment, a face of a suitable condition for personal authentication is selected from faces detected during the period of one cycle of personal authentication. This allows the accuracy of personal authentication processing executed at a predetermined cycle to be increased.

Second Embodiment

The second embodiment will be described next. In the second embodiment, the method of causing a CPU 101 to determine the personal authentication target face is different from that of the first embodiment. Note that in the second embodiment as well, the CPU 101 calculates the size of a detected face as a determination criterion, and determines a personal authentication target face of a suitable condition.

The face of a person who is not detected in the latest one of the plurality of detected images during the period of one cycle of personal authentication is excluded from the determination target. This is because the face that is not detected in the latest detected image has already disappeared from the image at a high probability.

Figure 5:
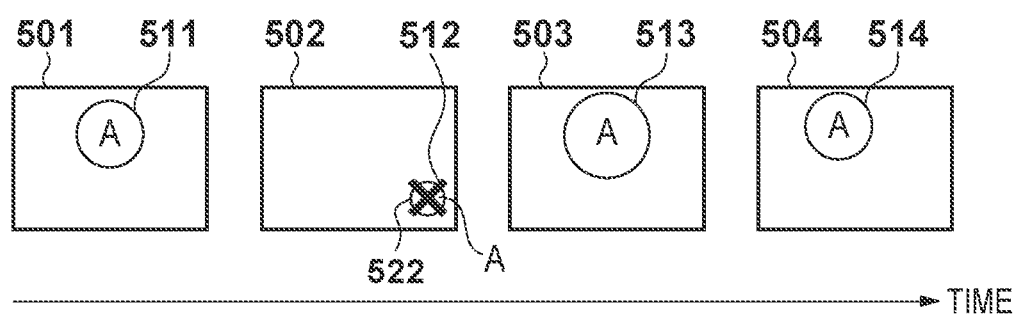
FIG. 5 is a view illustrating a method of determining a personal authentication target face according to the second embodiment.

In the second embodiment, the CPU 101 determines based on the correlation of the position and size of the detection result whether the faces detected during the period of one cycle belong to the same person (same person determination processing). FIG. 5 illustrates images detected during the period of one cycle. A face detection unit 124 performs face detection processing for detected images 501 to 504 in this order. First, the face detection unit 124 detects a face 511 of a person A in the detected image 501. Next, the face detection unit 124 determines that a face 512 in the detected image 502 does not belong to the person A. A cross 522 in FIG. 5 indicates this. Next, the face detection unit 124 detects a face 513 of the person A in the detected image 503 again, and similarly detects a face 514 of the person A in the detected image 504.

At this time, the CPU 101 determines based on the correlation of the position and size of the detection result between the images that the faces 511, 513, and 514 belong to the same person.

Figures 6A, 6B, 6C:
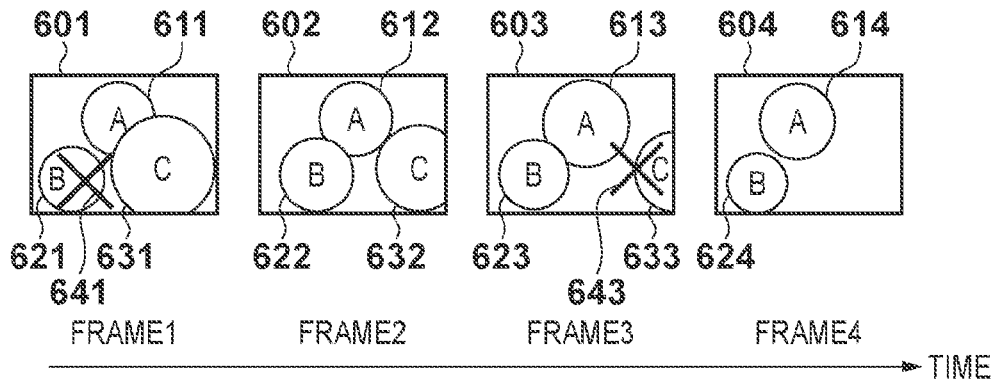
FIGS. 6A to 6C are views illustrating images and detection results obtained by face detection during the period of one cycle of personal authentication according to the second embodiment.

The method of determining the personal authentication target face according to this embodiment will be described next with reference to FIGS. 6A to 6C. FIG. 6A illustrates images detected during the period of one cycle of personal authentication. Referring to FIG. 6A, the face detection unit 124 performs face detection processing for a detected image 601 (frame 1), a detected image 602 (frame 2), a detected image 603 (frame 3), and a detected image 604 (frame 4) in this order. Areas 611, 621, and 631 of the detected image 601 schematically represent the faces of the persons A, B, and C, respectively. A cross 641 indicates that the face detection unit 124 cannot detect the person B looking downward. Similarly, areas 612, 622, and 632 of the detected image 602 and areas 613, 623, and 633 of the detected image 603 also schematically represent the faces of the persons A, B, and C, respectively. At this time, the person C in the detected image 603 is partially out of the frame, and a cross 643 indicates that the face detection unit 124 cannot detect the person C. In the detected image 604, the person C is completely out of the frame, and only the faces of the persons A and B indicated by 614 and 624 are detected.

The CPU 101 determines the personal authentication target face from the faces detected from the four detected images 601 to 604. By the above-described same person determination processing, the faces 611, 612, 613, and 614 in FIG. 6A are determined to belong to the person A. Similarly, the faces 622, 623, and 624 are determined to belong to the person B, and the faces 631 and 632 are determined to belong to the person C. Based on the result of same person determination processing, the CPU 101 generates a table as shown in FIG. 6B in which the detection results of the face sizes in the detected images 601 to 604 detected by the face detection unit 124 are organized by person. The face detection unit 124 sets a larger value for a larger face in the detected images. At this time, the face of the person C that is not detected in the latest detected image 604 is excluded from the determination target.

In FIG. 6B, the face of the person C detected in frame 1 has the maximum value "55". However, the person C is left out of the determination target. Out of the faces of the persons A and B of the determination target, the face 613 of the person A detected in frame 3 has the maximum value "50". Hence, the CPU 101 determines the face 613 of the person A in frame 3 as the personal authentication target face. Alternatively, for each of the persons A and B, the largest face may be determined as the personal authentication target. That is, the face 613 detected in frame 3 may be determined as the personal authentication target for the person A, and the face 622 detected in frame 2 may be determined as the personal authentication target for the person B.

The CPU 101 may set a threshold when determining the personal authentication target face, and prohibit personal authentication processing if the evaluation value of the determination criterion does not exceed the threshold in any face. More specifically, as shown in FIG. 6C illustrating the detection result that represents the size of the face in each image detected by the face detection unit 124 as a numerical value, the threshold is set to 20 using the face size as the determination criterion. In the detection result of FIG. 6C, the size does not exceed 20 in any face. Hence, the CPU 101 does not perform personal authentication processing.

According to the above-described embodiment, a face of a suitable condition for personal authentication is selected from faces detected during the period of one cycle of personal authentication while excluding unnecessary faces. This allows the accuracy of personal authentication processing executed at a predetermined cycle to be increased.

Note that in the above-described embodiments, the present invention is applied to a video camera. However, the present invention is not limited to this. That is, the present invention is also applicable to an image capturing apparatus such as a digital still camera or a cellular phone having a moving image capturing function and capable of capturing a plurality of images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-268719, filed Dec. 1, 2010, which is hereby incorporated by reference herein in its entirety.

What is claimed is:

1. An image processing apparatus comprising a processor for controlling:
   a face detection unit configured to periodically perform face detection processing of detecting a face area of a person from an image;
   an authentication unit configured to perform personal authentication processing for the face area detected by said face detection unit; and
   a calculation unit configured to calculate a determination criteria to select a face area as a target of the personal authentication processing from the face areas detected by said face detection unit, wherein said calculation unit calculates, as the determination criteria, at least one of a size, a tilt, a direction, a facial expression, and a motion of the face area detected by said face detection unit,
   wherein, when said face detection unit detects a plurality of face areas corresponding to the same person from a plurality of images, the authentication unit selects a target face area complying with the determination criteria calculated by said calculation unit from the plurality of face areas of the same person detected from the plurality of images as the target of the personal authentication processing and performs personal authentication processing for the selected target face area to authenticate the person corresponding to the selected target face area.

2. The apparatus according to claim 1, wherein when said face detection unit detects the face areas of the same person more than once from the plurality of images, said authentication unit selects at least one of a face area having a largest size, a face area having a smallest tilt, a face area directed most frontward, a face area without eye closure, and a face area with a smallest motion calculated by said calculation unit from the face areas of the same person detected from the plurality of images as the target face area of the personal authentication processing.

3. The apparatus according to claim 1, wherein when said face detection unit detects the plurality of face areas from the plurality of images, said authentication unit selects, as the target of the personal authentication processing, the target face area complying with the determination criteria calculated by said calculation unit from the plurality of face areas representing the same person as that of a face area in a latest image detected by said face detection unit.

4. The apparatus according to claim 1, wherein said authentication unit does not perform the personal authentication processing if the determination criteria calculated by said calculation unit is not more than a predetermined threshold for the image detected by said face detection unit.

5. An image processing apparatus in accordance with claim 1, wherein the authentication unit performs personal authentication processing for the selected target face area by calculating similarity between the selected target face area and one or more registered faces.

6. The image processing apparatus of claim 1, wherein said authentication unit periodically performs the personal authentication processing at a cycle longer than that of the face detection processing by said face detection unit.

7. The image processing apparatus of claim 1, wherein each determination criterion of the determination criteria includes a priority weight.

8. The image processing apparatus of claim 1, wherein the determination criteria comprises the face tilt, and wherein calculating the face tilt comprises calculating a tilt of a line that connects a mouth, a nose, and a center between eyes with respect to a vertical direction.

9. The image processing apparatus of claim 1, wherein the determination criteria comprises the face size, wherein the face size is determined by a number of pixels included in the face area, and wherein more weight is given to the face size that is larger.

10. The image processing apparatus of claim 9, wherein the face area complies with the determination criteria calculated by the calculation unit if the face area is a largest of a plurality of face areas extracted from a plurality of frames.

11. An image processing method comprising:
   a face detection step of periodically performing face detection processing of detecting a face area of a person from an image;
   an authentication step of performing personal authentication processing for the face area detected in the face detection step; and
   a calculation step of calculating a determination criteria to select a face area as a target of the personal authentication processing from the face areas detected in the face detection step, wherein said calculation step calculates, as the determination criteria, at least one of a size, a tilt, a direction, a facial expression, and a motion of the face area detected by said face detection step,
   wherein in the authentication step, when a plurality of face areas corresponding to the same person are detected from a plurality of images in the face detection step, a target face area complying with the determination criteria calculated in the calculation step is selected from the plurality of face areas of the same person detected from the plurality of images as the target of the personal authentication processing and personal authentication processing is performed for the selected target face area to authenticate the person corresponding to the selected target face area.

12. The method according to claim 11, wherein in the authentication step, when the face areas of the same person from the plurality of images are detected more than once in the face detection step, at least one of a face area having a largest size, a face area having a smallest tilt, a face area directed most frontward, a face area without eye closure, and a face area with a smallest motion calculated in the calculation step is selected from the face areas of the same person detected from the plurality of images as the target face area of the personal authentication processing.

13. The method according to claim 11, wherein in the authentication step, when the plurality of face areas are detected from the plurality of images in the face detection step, the target face area complying with the determination criteria calculated in the calculation step is selected as the target of the personal authentication processing from the plurality of face areas representing the same person as that of a face area in a latest image detected in the face detection step.

14. The method according to claim 11, wherein in the authentication step, the personal authentication processing is not performed if the determination criteria calculated in the calculation step is not more than a predetermined threshold for the image detected in the face detection step.

15. A non-transitory computer-readable storage medium storing a program that causes a computer to execute an image processing method of claim 11.

16. The method according to claim 11, wherein the authentication step comprises performing personal authentication processing for the selected target face area by calculating similarity between the selected target face area and one or more registered faces.

17. The method of claim 11, wherein in the authentication step, the personal authentication processing is periodically performed at a cycle longer than that of the face detection processing.

18. The method of claim 11, wherein each determination criterion of the determination criteria includes a priority weight.

19. The method of claim 11, wherein the determination criteria comprises the face tilt, and wherein calculating the face tilt comprises calculating a tilt of a line that connects a mouth, a nose, and a center between eyes with respect to a vertical direction.

20. The method of claim 11, wherein the determination criteria comprises the face size, wherein the face size is determined by a number of pixels included in the face area, and wherein more weight is given to the face size that is larger.

21. The method of claim 20, wherein the face area complies with the determination criteria calculated by the calculation step if the face area is a largest of a plurality of face areas extracted from a plurality of frames.

* * * * *